(12) United States Patent
Fees et al.

(10) Patent No.: US 9,437,852 B2
(45) Date of Patent: Sep. 6, 2016

(54) METHOD FOR MANUFACTURING A BATTERY, BATTERY ARRANGEMENT AND MODULAR SYSTEM

(71) Applicant: Audi AG, Ingolstadt (DE)

(72) Inventors: Heiner Fees, Bietigheim-Bissingen (DE); Ralf Maisch, Abstatt (DE); Andreas Track, Sachsenheim (DE); Alexander Eichhorn, Eppingen (DE); Ricky Hudi, Kasing (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/362,796

(22) PCT Filed: Nov. 27, 2012

(86) PCT No.: PCT/EP2012/004881
§ 371 (c)(1),
(2) Date: Jun. 4, 2014

(87) PCT Pub. No.: WO2013/083241
PCT Pub. Date: Jun. 13, 2013

(65) Prior Publication Data
US 2015/0125722 A1 May 7, 2015

(30) Foreign Application Priority Data
Dec. 5, 2011 (DE) .................. 10 2011 120 234 U

(51) Int. Cl.
*H01M 10/625* (2014.01)
*H01M 10/6561* (2014.01)
(Continued)

(52) U.S. Cl.
CPC ....... *H01M 2/1077* (2013.01); *H01M 10/5016* (2013.01); *H01M 10/5063* (2013.01); *H01M 10/5075* (2013.01); *H01M 10/613* (2015.04); *H01M 10/625* (2015.04); *H01M 10/6556* (2015.04); *H01M 10/6561* (2015.04);
(Continued)

(58) Field of Classification Search
CPC combination set(s) only.
See application file for complete search history.

(56) References Cited

U.S. PATENT DOCUMENTS 6,569,561 B1 * 5/2003 Kimura et al. ............... 429/159
7,955,729 B2 * 6/2011 Onuki et al. .................. 429/163
(Continued)

FOREIGN PATENT DOCUMENTS

DE  10 2008034887  *  6/2009  .......... H01M 105/50
DE  102008034887   *  6/2009  ............ H01M 10/50
(Continued)

OTHER PUBLICATIONS

International Search Report issued by the European Patent Office in International Application PCT/EP2012/004881 on Feb. 11, 2013.

*Primary Examiner* — Ula C Ruddock
*Assistant Examiner* — Osei Amponsah
(74) *Attorney, Agent, or Firm* — Henry M. Feiereisen LLC

(57) ABSTRACT

The invention relates to a method for manufacturing a battery (10) in which at least one battery module (12) having a plurality of battery cells (14) is provided. A cooling device (26) is selected depending on whether liquid cooling or cooling by a gaseous medium is intended for the at least one battery module (12). Depending on the selection, at least one first heat sink (26), through which a cooling liquid can flow, or at least one second heat sink, through which a gaseous medium can flow, is arranged on the at least one battery module (12) as the cooling device. The invention further relates to a battery arrangement and a modular system for producing a battery (10).

8 Claims, 2 Drawing Sheets

(51) Int. Cl.
*H01M 2/10* (2006.01)
*H01M 10/6567* (2014.01)
*H01M 10/6556* (2014.01)
*H01M 10/613* (2014.01)

(52) U.S. Cl.
CPC ..... *H01M10/6567* (2015.04); *H01M 2220/20* (2013.01); *Y10T 29/49004* (2015.01)

(56) References Cited

U.S. PATENT DOCUMENTS

2007/0259263 A1* 11/2007 Shibuya et al. ............. 429/186
2008/0251246 A1   10/2008 Ohkuma et al.

FOREIGN PATENT DOCUMENTS

| DE | 102008059966 | 6/2010 | |
|---|---|---|---|
| DE | 102009037012 | 2/2011 | |
| DE | 1020090588 0 | 6/2011 | |
| DE | 102009058808 | 6/2011 | |
| DE | 102010012025 | 9/2011 | |
| DE | 102010013025 | 9/2011 | |
| EP | 2 017 919 | 1/2009 | |
| EP | 2343769 A1 * | 7/2011 | ............ H01M 10/50 |
| JP | 05-275072 * | 10/1993 | ............ H01M 2/02 |
| JP | 2006-286519 | 10/2006 | |
| JP | 2006-324041 | 11/2006 | |
| WO | WO 2008/137240 | 11/2008 | |

* cited by examiner

METHOD FOR MANUFACTURING A BATTERY, BATTERY ARRANGEMENT AND MODULAR SYSTEM

CROSS-REFERENCES TO RELATED APPLICATIONS

This application is the U.S. National Stage of International Application No. PCT/EP2012/004881, filed Nov. 27, 2012, which designated the United States and has been published as International Publication No. WO 2013/083241 and which claims the priority of German Patent Application, Serial No. 10 2011 120 234.3, filed Dec. 5, 2011, pursuant to 35 U.S.C. 119(a)-(d).

BACKGROUND OF THE INVENTION

The invention relates to a method for manufacturing a battery, wherein at least a battery module is provided and has a plurality of battery cells, and wherein a cooling device is arranged to which at least a battery module. Furthermore, the invention relates to a battery arrangement, and a modular system for manufacturing a battery.

Electrically powered vehicles receive the energy, required for the drive, from a battery. To ensure a long battery life, heat is dissipated from the battery during operation to thus cool it. It is known hereby to use a liquid medium or a gaseous medium for cooling.

For example, DE 10 2009 037 012 A1 describes a battery unit for a hybrid vehicle, in which the battery unit has a battery channel. The battery channel has a first channel, in which an exhaust pipe of the hybrid vehicle and a cooling channel are arranged. The cooling channel is hereby arranged between the channel for the exhaust pipe and a bottom side of the battery unit. For controlling a temperature of the battery unit, air or a cooling liquid can be conducted through the cooling channel.

DE 10 2009 058 808 A1 describes a vehicle drive battery arrangement having a battery cell group, and a cooling apparatus. The cooling apparatus includes a carrier member which is configured as a ribbed hollow body in which reinforcing ribs and U-shaped brackets for a coolant duct are formed. Locking lugs on both sides of the coolant duct provide a formfitting attachment of the coolant duct on the carrier member. A spring elastic contact plate is arranged on the carrier member and maintained under tension against an underside of the battery cell group, when the cooling apparatus is attached to the battery cell group.

DE 10 2009 058 810 A1 also discloses a vehicle drive battery with a battery cell group and a cooling apparatus. A heat transfer member of the cooling apparatus is hereby configured to be resilient and extends convexly to a flat side when in a state in which it is not secured to the flat side of the battery cell group. The heat transfer member is screwed onto the flat side of the battery cell group and maintained hereby under elastic tension. Coolant ducts are in contact with the heat transfer member.

US 2008/0251246 A1 describes a cooling structure for batteries and electrical components such as control units and a converter. The batteries and the electrical components are hereby arranged in a receiving space in the vehicle floor of a hybrid vehicle. Two fans are used to cool the batteries, with cooling ribs of the electrical components being arranged in the cooling air flow downstream of the batteries.

Furthermore, EP 2 017 919 A1 describes a battery having a plurality of battery cells which are arranged in a housing. The housing forms cooling channels through which cooling air or cooling water can selectively flow.

In particular, when the battery is arranged in a vehicle, the specific installation space conditions must be considered. This means that depending on the vehicle type and the cooling provided for the vehicle type—such as liquid cooling or gas cooling—different cooling devices have to be provided.

As a consequence of the different configuration of the cooling devices, a great number of variants are needed, so that the manufacture becomes comparatively laborious and cost-intensive. In addition, depending on the shape of the battery modules and the cooling devices, appropriate receiving systems must be provided, which also has a negative effect on the complexity and costs during manufacture.

SUMMARY OF THE INVENTION

It is therefore an object of the present invention to provide a method of the afore-mentioned type as well as a battery arrangement and a modular system to enable a particularly simple and cost-effective manufacture.

The According to one aspect of the invention, the object is achieved by a method for manufacturing a battery used in particular in a vehicle, including the following steps:

a) providing at least one battery module having a plurality of battery cells;

b) determining demands from a cooling device for the battery, depending on whether liquid cooling or a cooling system with a gaseous medium is intended to be used for the battery;

c) selecting the cooling device in dependence on whether the liquid cooling or the cooling with a gaseous medium is provided for the at least one battery module;

d) arranging at least a first heat sink, through which a cooling liquid can flow, or at least a second heat sink, through which the gaseous medium can flow, on the at least one battery module as cooling device in dependence on the selection made in step b).

Depending on the desired type of cooling, the appropriate type of heat sink is arranged on the at least one battery module. This allows the use of a uniform battery module, even when different types of cooling of this battery module are provided. Such a modular design of the battery allows implementation of a simple and cost-efficient manufacture. Thus, depending on the posed cooling demands, the appropriate heat sink is chosen. The first heat sink may hereby in particular differ from the second heat sink such as to conform to the type of medium guided there through.

The use of a uniform battery module, especially useable for different vehicle types, enables a reduction in development costs and manufacturing cost for the battery.

The cooling medium used for cooling the battery may also be used for initial heating of the battery module, when the ambient temperature is low and thus when the battery is cold, so that the battery module reaches its desired capability particularly rapidly. For this purpose, the cooling medium used in the cooling mode for cooling the battery can be heated and then supplied to the still comparatively cold battery module. The cooling liquid or the gaseous cooling medium can therefore also provide heating of the battery module.

Preferably the first or the second heat sink is brought into contact with the at least one battery module to ensure in the cooling mode a particularly efficient removal of heat from the battery module.

When the selection of the cooling device is executed in dependence on the provision of a liquid cooling or a cooling with the gaseous medium by using a computing unit, a particularly efficient manufacture of the battery can be achieved.

A further advantage has been shown when the at least one first or second heat sink is placed in a receiving space which is formed between a support device and the at least one battery module. As a result, the support device and the battery module can be provided as unitary structures, useful in particular for different types of vehicle, regardless of the provided type of cooling. In this way, the battery can be manufactured with particularly low development costs and manufacturing costs.

The receiving space has defined cooling surfaces, at which heat can be removed from the battery module during the cooling mode, after placement of the first or second heat sink in the receiving space. The receiving space itself is, however universal, i.e. independent on whether it accommodates the heat sink for liquid cooling or the heat sink for cooling with a gaseous medium. The introduction of the particular heat sink in the receiving space results in a vehicle-specific battery, when the battery is used for a vehicle.

According to a further advantageous configuration, the at least one second heat sink through which the gaseous medium can flow, forms at least one cooling channel which is bounded by the support device at least on one side. As a result, efficient heat dissipation is realized, without the need to take particular measures to seal the at least one cooling channel.

It has been shown as a further advantage, when the at least one first heat sink, through which the cooling liquid can flow, is formed as a hollow body which is closed about the outer circumference and on which a battery module is arranged. As a result, the heat sink is particularly well designed to realize a liquid cooling, regardless of situations at hand at an installation site.

It is furthermore preferred when the at least one first or second heat sink is formed as a profile part which is formed through extrusion and on which at least one battery module is arranged. As a result, the respective heat sinks can be easily and inexpensively produced, and they can be especially easily brought to a length intended for cooling the battery module.

When the at least one first or the at least one second heat sink is made of an aluminum alloy, heat can be dissipated especially well via the latter. This is particularly true when cooling is provided by a gaseous medium. Such a cooling can be assisted in particular when leading the gaseous medium past a plurality of cooling ribs of the heat sink during the cooling mode.

Advantageously, the at least one first heat sink, through which the cooling liquid can flow, is arranged on the at least one battery module, when the battery is provided for an electric vehicle. In an electric vehicle, it is, in fact, of particular importance that even relatively large amount of heat can be dissipated very rapidly. In addition, demands of cooling capacity for liquid cooling can be complied with particularly easily or met with particularly accuracy.

Preferably, the at least one second heat sink, through which the gaseous medium can flow, is arranged on the at least one battery module, when the battery is provided for a hybrid vehicle. Using a gas cooling—and especially air cooling—the desired cooling capacity can easily and safely be realized in hybrid vehicles in a simple and for the type of application sufficient manner.

Finally, it has shown to be advantageous when at least two battery modules are arranged in the battery as viewed in flow direction of a cooling medium through the respective heat sink, together with the at least one heat sink associated to a respective one of battery modules in successive and/or side-by-side and/or superimposed relationship. By providing uniform battery modules and heat sinks respectively associated therewith, there is no need to provide particular cooling devices depending on the arrangement of the battery modules. Rather, the battery modules with their associated heat sinks can be flexibly coupled with one another.

When the battery modules are arranged behind one another, as viewed in flow direction, the heat sinks can also be very easily fluidly coupled with one another. In an arrangement of the battery modules with their associated heat sinks above one another or side-by-side, respective feed lines to inlets into the corresponding heat sinks are provided and branches which are connected to respective outlets of the heat sinks.

According to another aspect of the invention, the object is achieved by a battery arrangement, provided in particular for a vehicle, including at least a battery module having a plurality of battery cells. A support device of the battery arrangement is configured to hold the at least one battery module. The at least one battery module and the support device form a receiving space for at least one heat sink. The support device or the battery module includes at least one guide by means of which the at least one heat sink is brought into contact at least during introduction in the receiving space. The guide facilitates the insertion of the heat sink, provided for a respectively desired type of the cooling being a liquid cooling or a cooling with a gaseous medium, into the receiving space, so that the battery arrangement can be provided with a heat sink, provided for the application at hand, depending on the desired cooling.

In this way, a heat sink through which a cooling liquid can flow can be easily placed into the receiving space, when a liquid cooling system of the battery module is provided. As an alternative, also a heat sink through which a gaseous cooling medium can flow can be placed in the receiving space, when the at least one battery module is cooled by the gaseous medium. A simple and cost-effective production of a battery can be realized, when the heat sink provided for the particular application is guided along the at least one guide into the receiving space.

The support device preferably includes two rails substantially of L-shape in cross section for support of the at least one battery module. Thus, the rails maintain integrity of the battery module from below and to the side, when the battery module is arranged on the rails.

When being formed through extrusion, the two rails can be provided in a particularly easy manner with the intended length for support of the at least one battery module. As a robust and yet lightweight material, aluminum alloy in particular can hereby be used for the rails.

It has been shown as further advantageous, when the support device includes a support plate to connect the two rails, with the receiving space for the at least one heat sink being provided by the support plate, the two rails, and a bottom of the at least one battery module. In this way, the standardized receiving space can be formed in a simple way with components that are cost-effective and readily available, and can selectively accommodate the heat sink through which the cooling liquid can flow or the heat sink through which the gaseous medium can flow. The support plate can be formed in particular from: plastic.

Finally, it has been shown to be advantageous when the at least one guide is configured as a guide bar. Then, the at least one heat sink does not only contact the guide bar when introduced into the receiving space. Rather, the guide bar secures also the heat sink, placed into the receiving chamber, easily and reliably like a stop. This is especially true when the heat sink is surrounded on each of both sides by a guide bar. The at least one guide rail is especially easy to provide when configured in one piece with the support plate.

According to still another aspect of the invention, the object is achieved by a modular system for manufacturing a battery, including at least one battery module having a plurality of battery cells. Further provided is a support device for holding the at least one battery module, and at least one cooling device which can be arranged on the at least one battery module. The at least one cooling device includes hereby a first heat sink through which a cooling liquid can flow and/or a second heat sink through which a gaseous medium can flow. The at least one battery module and the support device can define a receiving space for at least one of the heat sinks, with the receiving space being universally configured for arrangement of the first or the second heat sink. Thus, either the modular system can be used for manufacturing a battery with liquid cooling, or the modular system for manufacturing a battery with a gas or air cooling, or the modular system may include both heat sinks, so that the desired heat sink can be selectively arranged on the battery module.

The advantages described for the method according to the invention and the battery arrangement according to the invention and preferred embodiments also apply for the modular system according to the invention, and vice versa.

The foregoing features and feature combinations mentioned in the description and the features and feature combinations mentioned hereinafter in the figure description and/or shown alone in the figures are applicable not only in the respectively indicated combination, but also in other combinations or taken alone, without departing the scope of the invention.

BRIEF DESCRIPTION OF THE DRAWING

Further advantages, features and details of the invention will become apparent from the claims, the following description of preferred embodiments, and from the drawings, in which like or functionally same elements are provided with identical reference signs. It is shown in:

DETAILED DESCRIPTION OF PREFERRED EMBODIMENTS

Figure 1:
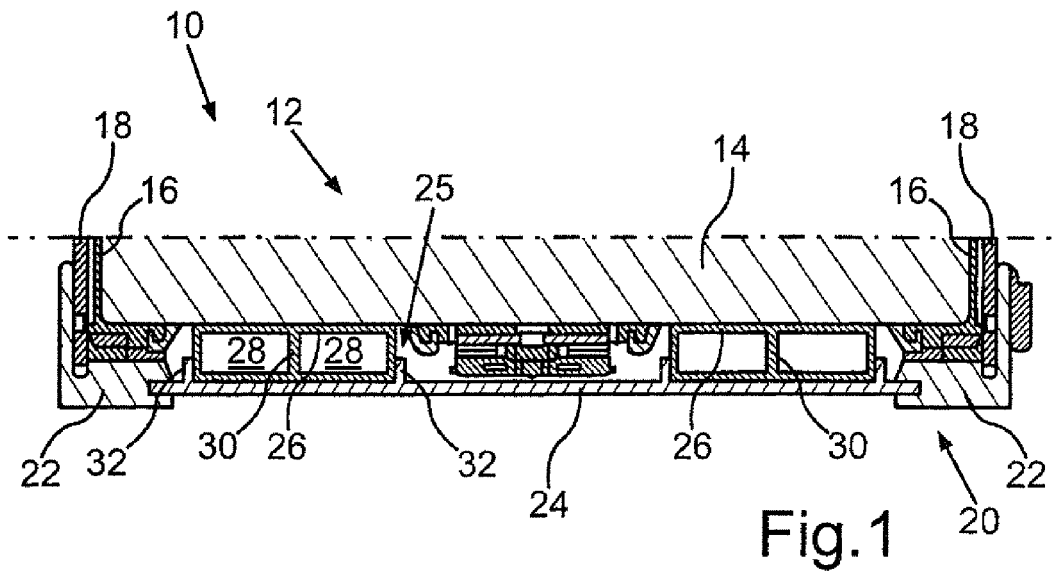
FIG. 1 a sectional view of a portion of a battery with liquid cooling.

FIG. 1 shows a section of a battery module 12 of a battery 10, which can be configured as vehicle battery in particular, with the battery module 12 having a plurality of battery cells 14. The battery cells 14 are electrically isolated from each other by so-called separators or spacers 16. The battery module 12 is bounded to the side by respective side plates 18 which are also referred to as binders. The side plates 18 fix the spacers 16 relative to one another and connect (here not shown) end plates of the battery module 12 with one another to close the battery module 12 towards its end faces.

The battery 10 also includes a support device 20 having two rails 22 of L-shape in cross section, which are preferably formed as extrusions from an aluminum alloy. The rails 22, which are arranged at respective corners of the battery module 12, support the battery module 12 from below and embrace the battery module 12 to the sides.

The two rails 22 are connected to one another by a support plate 24 having ends which—as shown here by way of example—engage longitudinal grooves formed in the two rails 22. In alternative embodiments, other types of connection of the support plate 24 to the rails 22 can be realized.

The support plate 24 bounds to the lower side a receiving space 25 which is bounded at the top by a bottom of the battery module 12. In the battery 10 shown in FIG. 1, two heat sinks 26 formed as closed hollow bodies are placed in this receiving space 25 and in contact with both the support plate 24 and the bottom of the battery 12.

These heat sinks 26 are provided for liquid cooling of the battery module 12, i.e. a cooling liquid flows there through during cooling mode. In this way, especially large amounts of heat can be removed from the battery module 12. Therefore, such a cooling device can be provided especially when the battery 10 is to be used in an electric vehicle which utilizes the electric energy solely made available by the battery 10 for propulsion. Cooling channels 28 of the respective heat sink 26 may be separated from each other by a partition wall 30 or by a plurality of partition walls.

Formed in one piece with the support plate 24 are guide rails 32 which laterally embrace here the two heat sinks 26 and facilitate insertion of the heat sinks 26 into the receiving space 25. When being placed into the receiving space 25, the respective heat sinks 26 contact the two guide rails 32 that laterally embrace them. In addition, the guide rails 32 secure the heat sinks 26 in their place in the receiving space 25.

Figure 2:
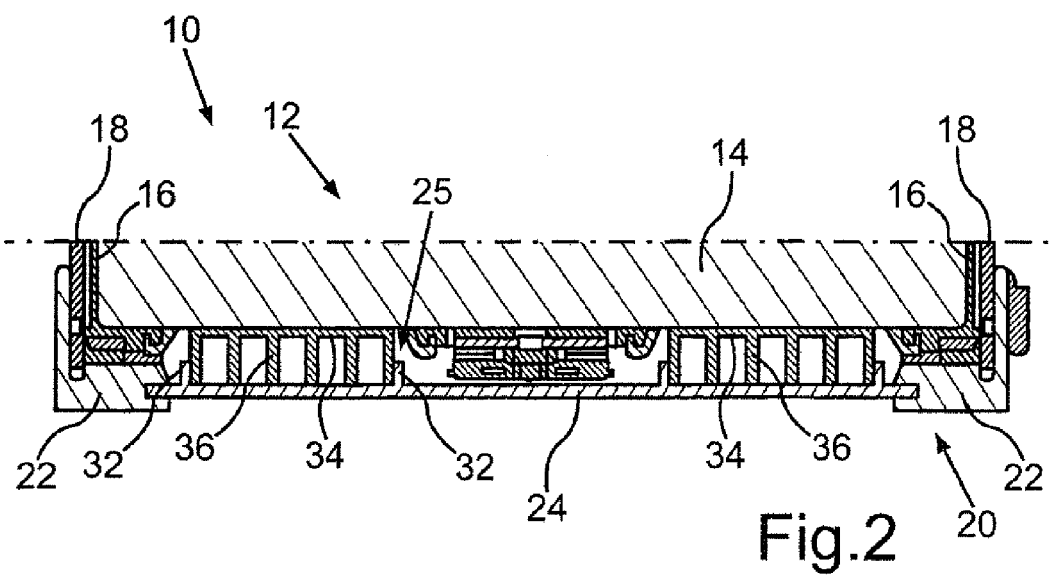
FIG. 2 a sectional view of a portion of a battery of identical construction, but with air cooling.

Particularly in conjunction with FIG. 2, it becomes clear that the same battery module 12 and the same support device 20 of the battery 10 may use as an alternative air-cooling or gas cooling. In the embodiment of the battery 10 shown in FIG. 2, two heat sinks 34 are placed in the receiving space 25 in respective regions laterally bound by the two guide rails 32 for cooling the battery module 12 by air or such a gaseous medium.

The two heat sinks 34, just like the heat sinks 26 provided for the liquid cooling, are also arranged between the support plate 24 on one hand and the battery module 12 on the other hand and contact the battery cells of the battery module 12. The two heat sinks 34 are formed in the battery 10 shown in FIG. 2 as profile parts which are open towards the bottom side and have a plurality of cooling ribs 36. The cooling ribs 36 define cooling channels that separated from each other and bounded downwardly by the support plate 24.

While the heat sinks 26, 34 and the rails 22 are preferably made from an aluminum alloy through extrusion, plastic can be used in particular for the support plate 24.

The battery 10 (see FIG. 2) having air cooling can be used especially in a hybrid vehicle which poses less demands on the cooling of the battery 10 as opposed to a purely electrically powered vehicle.

The battery 10 can therefore selectively be equipped with heat sinks 26 provided for liquid cooling (see FIG. 1) or heat sinks 34 provided for air cooling (see FIG. 2), wherein the standardized receiving space 25 is provided for each of the two types of heat sinks 26, 34.

The guide bars 32 are also provided in the receiving space 25 to facilitate insertion of the heat sink 26, 34 intended for the respectively desired type of cooling and to fix the respective heat sink 26, 34 in place.

Thus, a standardized battery module 12 and a standardized support device 20 are made available which can be provided with the appropriate heat sink 26, 34 depending on the desired cooling of the battery 10. Therefore, there is no need to provide cooling devices that are specifically tailored to the particular shape of the battery 10, but, depending on the desired type of cooling, the appropriate heat sink 26, 34 can be introduced into the receiving space 25.

Figure 3:
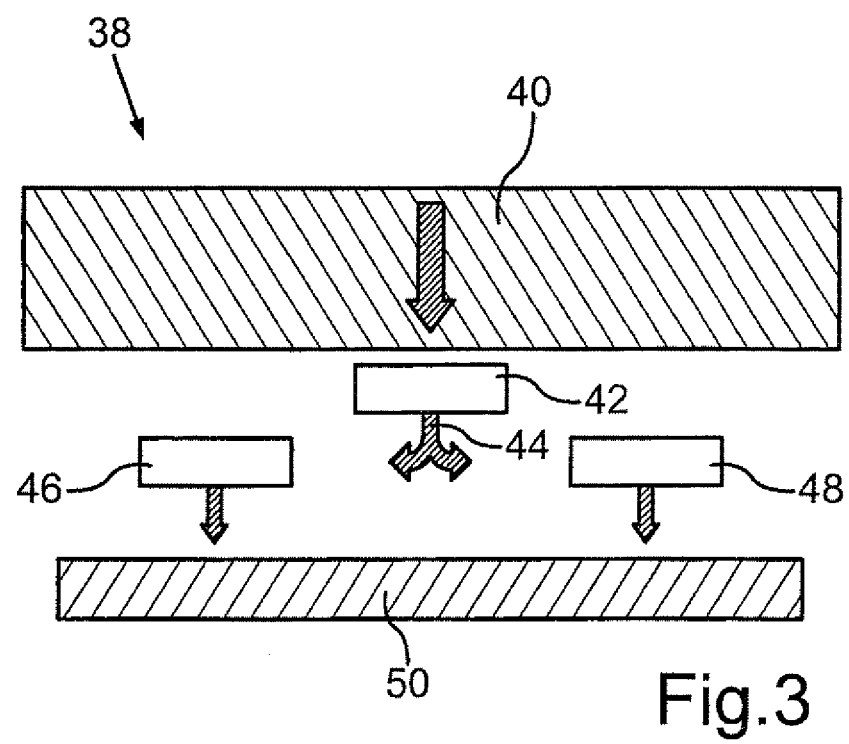
FIG. 3 a flow diagram illustrating the manufacture of a battery in which liquid cooling or gas cooling is selectively used.

FIG. 3 illustrates a flow diagram 38 of a method to provide in dependence on the desired cooling for a battery 10 a suitable heat sink 26, 34 for the battery 10 that is specific for the vehicle.

In step 40, the uniform battery module 12 and the uniform support device 20 are provided. Thereafter, in step 42, demands on the cooling system for the desired battery 10 are determined. Subsequently, in step 44, a selection of the cooling system is made depending on whether liquid cooling or air or gas cooling is to be used for the battery 10.

When a liquid cooling is provided for the battery 10, the heat sink 26, through which a cooling liquid can flow, is placed in step 46 into the receiving space 25 formed between the support device 20 and the bottom of the battery module 12.

When, on the other hand, air cooling system is selected for the battery 10 in step 44, then the heat sink 34 through which gas or air can flow is arranged in step 48 into the receiving space 25 formed between the support device 20 and the bottom of the battery module 12.

In both cases, a battery 10 is provided in step 50 which is suited to the vehicle-specific cooling requirements and which is modular in construction and thereby greatly reduces development costs and manufacturing costs.

The battery 10 provided for the particular vehicle may have a plurality of battery modules 12. When these battery modules 12 are arranged behind one another, the support device 20 and the heat sinks 26, 34 can be provided with the intended length appropriate for several battery modules 12 in a particularly simple manner.

The battery modules 12 may, however, also be arranged side-by-side, in which case each battery module 12 is being provided preferably with a support device 20 having the appropriate length. Also the heat sinks are then preferably provided with the length appropriate for the respective battery module 12. The battery 10 can then be cooled by merely connecting the respective cooling liquid conduits or cooling air conduits to the particular heat sink 26, 34. This applies in a similar manner, when the battery modules 12 with their associated support devices 20 and heat sinks 26, 34 are stacked above one another in the vehicle.

The invention claimed is:

1. A battery arrangement, comprising:
   at least one battery module having a plurality of battery cells;
   a support device configured to hold the at least one battery module and having two rails of substantially L-shaped cross section for supporting the at least one battery module and a single-piece support plate which is separate from said two rails, each of said rails has a vertical leg and also a horizontal leg with a longitudinal groove having a width in a vertical direction, said support plate extending between said two rails in a longitudinal direction and having two horizontally extending ends each having a vertical width which corresponds to the vertical width of the longitudinal groove and each fittingly engaging in a corresponding one of the longitudinal grooves of the horizontal legs of said two rails to connect them with each other, said at least one battery module and said support plate of said support device defining a receiving space;
   at least one heat sink insertable in the receiving space and configured to provide liquid cooling or cooling with a gaseous medium; and
   at least one guide arranged between the rails and configured to facilitate insertion of the at least one heat sink into the receiving space and to contact the at least one heat sink, when the at least one heat sink is accommodated in the receiving space in the guide, said guide being part of the support device or the battery module and including at least two vertical guide rails which extend in the receiving space upwardly from said support plate and in a direction transverse to the longitudinal direction, said vertical guide rails are of one piece with said support plate and are spaced from said ends of said support plate and are spaced from each other in the longitudinal direction to receive each of the heat sinks exclusively directly between the two of the vertical guide rails extending from the support plate without intermediate elements so as to laterally embrace the heat sink, said support plate having a straight upper horizontal surface and each of said heat sinks has a straight lower horizontal surface and contact with said straight upper horizontal surface of said support plate.

2. The battery arrangement of claim 1, constructed for use in a vehicle.

3. The battery arrangement of claim 1, wherein the rails are formed through extrusion.

4. The battery arrangement of claim 3, wherein the rails are made of an aluminum alloy.

5. The battery arrangement of claim 1, wherein said support plate of the support device, said two rails, and a bottom of the at least one battery module jointly define the receiving space for the at least one heat sink.

6. The battery arrangement of claim 5, wherein the support plate is made from a plastic.

7. The battery arrangement of claim 1, wherein the at least one guide is configured as a guide bar.

8. The battery arrangement of claim 7, wherein the guide bar is formed in one piece with the support plate.

* * * * *

UNITED STATES PATENT AND TRADEMARK OFFICE
CERTIFICATE OF CORRECTION

PATENT NO. : 9,437,852 B2  
APPLICATION NO. : 14/362796  
DATED : September 6, 2016  
INVENTOR(S) : Heiner Fees et al.

Page 1 of 1

It is certified that error appears in the above-identified patent and that said Letters Patent is hereby corrected as shown below:

On the Title Page

Column two, item (56) under FOREIGN PATENT DOCUMENTS, correct "DE 1020090588 0" to read --DE 102009058810--.

Signed and Sealed this
Eighteenth Day of April, 2017

Michelle K. Lee
*Director of the United States Patent and Trademark Office*